United States Patent [19]

Hisamoto et al.

[11] 4,383,932
[45] May 17, 1983

[54] WATER REMOVING COMPOSITION

[75] Inventors: Iwao Hisamoto, Suita; Chiaki Maeda, Settsu; Yukio Omure, Takatsuki; Takashi Onishi, Higashiosaka, all of Japan

[73] Assignee: Daikin Kogyo Co., Ltd., Osaka, Japan

[21] Appl. No.: 848,732

[22] Filed: Nov. 4, 1977

[51] Int. Cl.³ .................................................. C09K 3/00
[52] U.S. Cl. .................................. 252/194; 148/6.14 R; 134/3;41
[58] Field of Search ........................... 252/194; 34/9; 148/6.14 R; 422/12

[56] References Cited

U.S. PATENT DOCUMENTS

| | | | |
|---|---|---|---|
| 3,397,150 | 8/1968 | Burt et al. | 252/194 |
| 3,577,348 | 5/1971 | Clementson et al. | 252/153 |
| 3,653,983 | 4/1972 | Ziehr et al. | 252/194 |
| 4,161,450 | 7/1979 | Vitat et al. | 252/194 |

FOREIGN PATENT DOCUMENTS 49-14383 2/1974 Japan .
49-11556 3/1974 Japan .
49-55583 5/1974 Japan .

Primary Examiner—J. L. Barr
Attorney, Agent, or Firm—Armstrong, Nikaido, Marmelstein & Kubovcik

[57] ABSTRACT

A water removing composition suitable for use in treating solid surfaces which comprises (a) a halogenated hydrocarbon solvent, (b) at least one member selected from the group consisting of amines having an oxyalkylene group, their salts with an organic acid of the formula, $R^1COOH$, $HOOCR^2COOH$, $R^1SO_3H$, $R^1O\text{-}PO_3H$ or $(R^1O)_2PO_2H$, wherein $R^1$ is an alkyl group having 1 to 20 carbon atoms which may be substituted with a hydroxyl group or an alkylphenyl group having 7 to 26 carbon atoms and $R^2$ is an alkylene group having 1 to 10 carbon atoms, and quaternary ammonium salts composed of an ammonium having an oxyalkylene group and an acid radical of the above-mentioned organic acids, and (c) at least one substituted amine salt with dialkyl sulfosuccinate of the formula

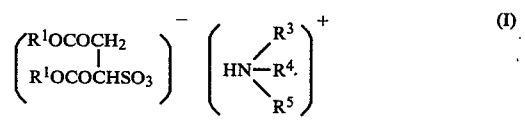

wherein $R^1$ is as defined above, and $R^3$, $R^4$ and $R^5$ are the same or different and each is hydrogen, an alkyl group having 1 to 20 carbon atoms which may be substituted with a hydroxyl group or a polyoxyalkylene group, provided that all $R^3$, $R^4$ and $R^5$ are not hydrogen at the same time. The composition can quickly and completely remove water from solid surfaces and can quickly and completely separate the removed water from the solvent, and also can exhibit such excellent effects stably even in use for a long period of time.

2 Claims, No Drawings

WATER REMOVING COMPOSITION

BACKGROUND OF THE INVENTION

The present invention relates to a novel water removing composition suitable for use in treating surfaces of solids such as metals, ceramics and plastics.

It is known that compositions consisting of halogenated hydrocarbon solvents and surface active agents of certain kind, particularly amines or neutralization products of amines and organic or inorganic can be employed for treating solid surfaces to remove water. For instance, neutralization products of alkyl phosphates and alkylamines are proposed as the above-mentioned surface active agents in U.S. Pat. No. 3,397,150. Also, particular amines having an oxyalkylene group or neutralization products of these amines and organic or inorganic acids are proposed as the surface active agents in Japanese Patent Publication No. 11556/1974 and Japanese Patent Disclosure Nos. 13087/1974, 14383/1974 and 55583/1974. Further, DT-OS No. 2,355,908 discloses diamides of certain kind as the surface active agents.

In general, water removing compositions applied to the surface treatment are required to be able to quickly and completely remove water from solid surfaces (that is, to have excellent water removing ability), and to be able to quickly and completely separate the removed water without forming an emulsion phase with a solvent (that is, to have excellent ability of separating water). It is also required that surface active agents to be dissolved in solvents are hard to dissolve in water and the power of the surface active agent stands for a long period of time.

The present inventors have studied known water removing compositions and found that in general, the higher the water removing ability of these known compositions, the more the water removed from treated surfaces forms easily the emulsion phase with a solvent and thus the slower the rate of the separation of water from solvent becomes. Thus, known water removing compositions do not possess both of excellent water removing ability and excellent water separating ability. Therefore, compositions excellent in both water removing and water separating abilities are desired.

OBJECTS OF THE INVENTION

It is an object of the present invention to provide a composition suitable for removing water from solid surfaces.

A further object of the invention is to provide a water removing composition which can quickly and completely remove water from solid surfaces and moreover can separate quickly and completely water from a solvent.

A still further object of the invention is to provide a water removing composition which can exhibit such effects for a long time.

These and other objects of the invention will become apparent from the description hereinafter.

DETAILED DESCRIPTION

It has now been found that the above-mentioned objects can be attained by a composition which comprises (a) a halogenated hydrocarbon solvent, (b) at least one member selected from the group consisting of amines having an oxyalkylene group, their salts with an organic acid having the general formula of $R^1COOH$, $HOOCR^2COOH$, $R^1SO_3H$, $R^1OSO_3H$, $R^1OPO_3H$ or $(R^1O)_2PO_2H$, wherein $R^1$ is an alkyl group having 1 to 20 carbon atoms which may be substituted with a hydroxyl group, or an alkylphenyl group having 7 to 26 carbon atoms and $R^2$ is an alkylene group having 1 to 10 carbon atoms, and quaternary ammonium salts composed of an ammonium having an oxyalkylene group and an acid radical of the above-mentioned organic acids, and (c) at least one substituted amine salt with a dialkyl sulfosuccinate having the following general formula

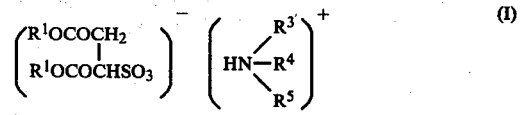

wherein $R^1$ is as defined above, and $R^3$, $R^4$ and $R^5$ are the same or different and each is hydrogen, an alkyl group having 1 to 20 carbon atoms which may be substituted with a hydroxyl group, or a polyoxyalkylene group, provided that all $R^3$, $R^4$ and $R^5$ are not hydrogen at the same time.

That is to say, the present invention relates to a novel composition containing at least one member selected from the group consisting of the above specific amines, their salts with the above specific organic acid and the above specific quaternary ammonium salts, these members being hereinafter referred to as "amine or amine salt", and at least one above specific substituted amine salt with dialkyl sulfosuccinate, and the object of the invention lies particularly in enhancing the ability of separating water from a solvent without decreasing the excellent water removing ability that a composition consisting of the halogenated hydrocarbon solvent and the "amine or amine salt" possesses, by making the particular amine salt with dialkyl sulfosuccinate coexist therein.

Such water removing compositions of new type have excellent properties in both water removing and water separating abilities. Also, the compositions of the present invention can exhibit such excellent abilities stably in use for a long period of time. It is very important for the water removing composition that the separation of water from a solvent can be attained quickly and completely. When the separation rate of water from solvent is slow and the separation is insufficient, the capacity of a water separator must be made large and in certain cases, a substantial quantity of solvent may be lost, since water is discharged from an apparatus in company with a solvent before the separation is completed.

In the present invention, the expression "having an oxyalkylene group" denotes mono- or poly-oxyalkylene groups, and in such polyoxyalkylene groups those such as oxyethylene/oxypropylene block copolymer are also included.

The amines having an oxyalkylene group which are preferably employed in the present invention are mono- or poly-oxyalkylenealkylamines, having the following general formula

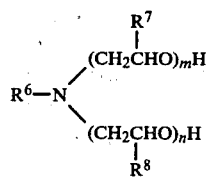

(II)

wherein $R^6$ is an alkyl group having 6 to 20 carbon atoms which may be straight chained or branched chained, $R^7$ and $R^8$ are hydrogen or methyl group, and m and n are 0 or an integer of 1 to 5 and m+n equals 1 to 10, and mono- or poly-oxy-alkylenedialkylamines having the following general formula

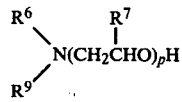

(III)

wherein $R^6$ and $R^7$ are as defined above, $R^9$ is an alkyl group having 1 to 15 carbon atoms, and p is an integer of 1 to 6.

The amine salts with the organic acid employed preferably in the present invention are neutralization products of the amines having the general formulas II and III and the organic acids having the general formulas of $R^1COOH$, $HOOCR^2COOH$, $R^1SO_3H$, $R^1OSO_3H$, $R^1OPO_3H$ and $(R^1O)_2PO_2H$, wherein $R^1$ and $R^2$ are as defined above.

The quaternary ammonium salts composed of the ammonium having an oxyalkylene group and the acid radical of the specific organic acid, which are preferably employed in the present invention, are those having the following general formula

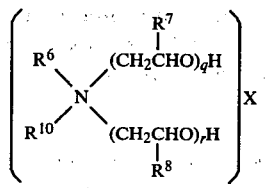

(IV)

wherein $R^6$, $R^7$ and $R^8$ are as defined above, $R^{10}$ is an alkyl group having 1 to 20 carbon atoms, q and r are an integer of 1 to 5 and q+r equals 2 to 6, and X is an acid radical of the organic acids as defined above.

Typical examples of such "amine or amine salt" employed in the present invention are hydroxyethyllaurylamine, polyoxyethylene(4)palmitylamine (the figure in parentheses showing the total number of the oxyethylene units, and thereinafter referring to the same), polyoxyethylene(2)stearylethylamine, polyoxyethylene(5)dilaurylamine, lauryldiethanolamine dibutylphosphate, polyoxyethylene(3)tetradecylamine octylate, polyoxyethylene(2)dilaurylamine nonylbenzenesulfonate,

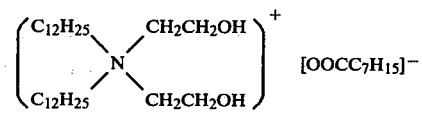

-continued

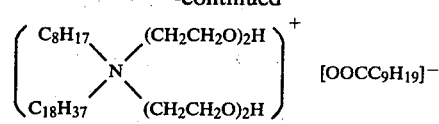

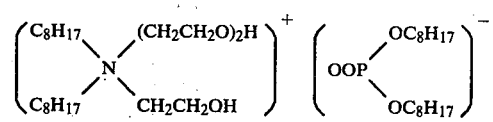

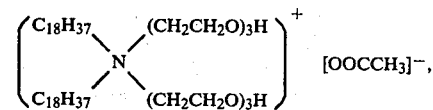

In the substituted amine salts with dialkyl sulfosuccinate of the formula I,

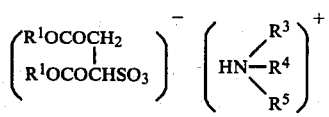

(I)

$R^1$ is, as described before, an alkyl group having 1 to 20 carbon atoms which may be substituted with a hydroxyl group, or an alkylphenyl group having 7 to 26 carbon atoms, in which the alkyl group may be straight or branched chained. $R^3$, $R^4$ and $R^5$ are, as described before, hydrogen atom, an alkyl group having 1 to 20 carbon atoms which may be substituted with a hydroxyl group, or a polyoxyalkylene group, and all $R^3$, $R^4$ and $R^5$ may be the same or $R^3$, $R^4$ and $R^5$ may be different from each other. Further, the alkyl group may be straight or branched chained, and may be suturated or unsaturated alkyl groups and also may be cycloalkyl group.

Examples of the substituted amine salt with sulfosuccinate represented by the general formula I are monoethanolamine salt with dibutyl sulfosuccinate, sec-butylamine salt with dibutyl sulfosuccinate, hexylamine salt with dihexyl sulfosuccinate, octylamine salt with dihexyl sulfosuccinate, triethylamine salt with di-n-octyl sulfosuccinate, diethanolhexylamine salt with di-n-octyl sulfosuccinate, triethanolamine salt with di-2-ethylhexyl sulfosuccinate, hexylamine salt with di-2-ethylhexyl sulfosuccinate, dioctylamine salt with di-2-ethylhexyl sulfosuccinate, dioctylamine salt with di-2-ethylhexyl sulfosuccinate, laurylamine salt with di-2-ethylhexyl sulfosuccinate, laurylethanolamine salt with di-2-ethylhexyl sulfosuccinate, oleylamine salt with di-2-ethylhexyl sulfosuccinate, polyoxyethylene(4-)laurylamine salt with didecyl sulfosuccinate, dimethylethanolamine salt with dilauryl sulfosuccinate, di(2-hydroxypropyl) hexylamine salt with diluryl sulfosuccinate and octylamine salt with distearyl sulfosuccinate.

The amount of the substituted amine salt with dialkyl sulfosuccinate of the component (c) is usually from 1 to 50% by weight, preferably from 5 to 30% by weight, based on the total weight of the components (b) and (c) employed. When the amount of the substituted amine salt is less than the above range, the separation effect of water from the solvent is usually small, and when the amount is larger than the above range, it tends to have a bad influence on the water removing effect.

It is known that salts of dialkyl sulfosuccinate such as sodium, ammonium or amine salt emulsify water into a halogenated hydrocarbon and, therefore, are effective for the formation of emulsion phase, for instance, as described in U.S. Pat. No. 3,577,348. That is to say, heretofore, it has been considered that the salts of sulfosuccinate have the excellent power of forming an emulsion of water-in-oil type, and, therefore, they rather render the separation of water from a solvent difficult.

On the contrary, among the salts of dialkyl sulfosuccinate, particularly the substituted amine salts exhibit the unexpected effect that they can enhance the ability of separating water from the solvent as stated before, when used in combination with the "amine or amine salt", in the present invention. Thus, there has been made clear for the first time by the present inventors the fact that the substituted amine salts with dialkyl sulfosuccinate in the present composition strikingly exhibit the water separating ability which is contrary to the ability of emulsion formation which has been heretofore known. The reason why the substituted amine salts exhibit the ability of enhancing the water separating ability when used in combination with the "amine or amine salt" is now under investigation. The alkaline metal salts and ammonium salt may also be employed as well as the substituted amine salts, but they cannot exhibit the effect over a long time though the water separating ability can be enhanced in the initial stage.

In the present invention, other usual surface active agents may be employed with the substituted amine salt with dialkyl sulfosuccinate. Examples of the preferred surface active agent employed in combination with the substituted amine salt are alkylamine salts with fatty acids such as stearylamine octylate and laurylamine hexylate, and alkylamine salts with alkylphosphoric acids such as dioctylamine didecylphosphate and laurylamine dioctylphosphate. When these surface active agents are added to the halogenated hydrocarbon solvent containing only the "amine or amine salt" without using in combination with the substituted amine salt with dialkyl sulfosuccinate, they can slightly enhance the water separating ability, but its effect is insufficient and does not last. However, when these compounds are employed in combination with the substituted amine salt with dialkyl sulfosuccinate, the water separating ability can be promoted. The amount of such a compound employed according to the present invention is preferably not more than 30% by weight based on the total weight of the surface active agents employed. When the amount is over 30% by weight, it produces a bad influence on the water removing ability.

The total amount of the surface active agents present in the composition according to the present invention is usually from 0.05 to 10% by weight, preferably from 0.1 to 2% by weight, based on the weight of the halogenated hydrocarbon solvent.

Examples of the halogenated hydrocarbon solvent employed in the present invention are trichloromonofluoromethane, 1,1,2,2-tetrachloro-1,2-difluoroethane, 1,1,2-trichloro-1,2,2-trifluoroethane, 1,1-dichloro-2,2,2-trifluoroethane, trichloroethane, trichloroethylene, and dichloroethane. They may be employed alone or in a mixture thereof. Also, as occasion demands, azeotropes containing such a halogenated hydrocarbon may be employed as the solvent, for instance, a mixture of 50.5% by weight 1,1,2-trichloro-1,2,2-trifluoroethane and 49.5% by weight methylene chloride, a mixture of 96.0% by weight 1,1,2-trichloro-1,2,2-trifluoroethane and 4.0% by weight ethanol, a mixture of 57.2% by weight 1,1,2,2-tetrachloro-1,2-difluoroethane and 42.8% by weight 1,2-dichloroethane, and a mixture of 72.8% by weight 1,1,2,2-tetrachloro-1,2-difluoroethane and 27.2% by weight methyl isopropyl ketone.

The water removing composition of the present invention is more specifically described and explained by means of the following Examples, in which all percentages are by weight.

EXAMPLE 1

Experiments were conducted to make clear that the substituted amine salts with dialkyl sulfosuccinate had not a bad influence on water removing ability.

Stainless steel ball bearings, surfaces of which were previously rinsed, were immersed in water and then shaken sharply in a Buchner funnel to remove the greater part of the water held on the surfaces. The wet bearings were then immersed for the prescribed time in 1,1,2-trichloro-1,2,2-trifluoroethane solutions containing 0.5% of the "amine or amine salt" alone or a mixture of the "amine or amine salt" and the substituted amine salt with or without the other surface active agent, as shown in Table 1, replaced in a dry Buchner funnel and flushed with the prescribed amount of anhydrous methanol. The methanol was collected and then the amount of the water contained in the methanol was analyzed by the Karl Fisher method (A value). The amount of water was analyzed in the same manner as the above except that the treatment with the water removing composition was omitted (blank: B value). The percent water removal was calculated according to the following equation.

$$\text{Water removal (\%)} = \frac{B - A}{B} \times 100$$

These experiments were conducted at a room temperature.

The results are shown in Table 1. In Table 1 below and also Tables 2 and 3 shown after, the weight ratio of the "amine or amine salt" to the substituted amine salt with dialkyl sulfosuccinate or to the mixture thereof with the other surface active agent is 80:20. Also, surface active agent A in the Tables represents

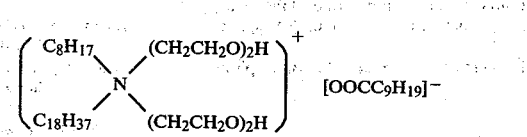

TABLE 1

| | Surface Active Agent | % Water Removal | | |
|---|---|---|---|---|
| Amine or amine salt | Substituted amine salt with sulfosuccinate (plus other surface active agent) | Treatment for 10 sec. | Treatment for 20 sec. | Treatment for 30 sec. |
| Polyoxyethylene(3)laurylamine | — | 94 | 98 | 98 |
| Polyoxyethylene(3)laurylamine | Di(2-hydroxypropyl)hexylamine salt with dilauryl sulfosuccinate | 92 | 97 | 98 |
| Polyoxyethylene(3)laurylamine | Triethanolamine salt with dilauryl | 93 | 98 | 98 |

TABLE 1-continued

| Surface Active Agent | | % Water Removal | | |
| --- | --- | --- | --- | --- |
| Amine or amine salt | Substituted amine salt with sulfosuccinate (plus other surface active agent) | Treatment for 10 sec. | Treatment for 20 sec. | Treatment for 30 sec. |
| Polyoxyethylene(3)stearyl-ethylamine | sulfosuccinate — | 92 | 97 | 97 |
| Polyoxyethylene(3)stearyl-ethylamine | Octylamine salt with dihexyl sulfo-succinate | 92 | 96 | 97 |
| Polyoxyethylene(3)stearyl-ethylamine | Polyoxyethylene(4)laurylamine salt with didecyl sulfosuccinate | 91 | 95 | 96 |
| Lauryldiethanolamine dibutylphosphate | — | 94 | 97 | 98 |
| Lauryldiethanolamine dibutylphosphate | Lauryldimethylamine salt with di-2-ethylhexyl sulfosuccinate | 93 | 97 | 97 |
| Lauryldiethanolamine dibutylphosphate | Lauryldimethylamine salt with di-2-ethylhexyl sulfosuccinate + Stearylamine octylate (2:1 by wt.) | 93 | 96 | 97 |
| A + Lauryldiethanolamine di-octylphosphate (9:1 by wt.) | — | 95 | 98 | 99 |
| A + Lauryldiethanolamine di-octylphosphate (9:1 by wt.) | Hexylamine salt with di-2-ethyl-hexyl sulfosuccinate | 95 | 97 | 99 |
| Polyoxyethylene(2)dilauryl-amine nonylbenzenesulfonate | — | 93 | 96 | 97 |
| Polyoxyethylene(2)dilauryl-amine nonylbenzenesulfonate | Stearylamine salt with di-n-octyl sulfosuccinate | 93 | 96 | 97 |
| Polyoxyethylene(2)dilauryl-amine nonylbenzenesulfonate | Hexyldiethanolamine salt with di-n-octyl sulfosuccinate | 92 | 95 | 96 |

EXAMPLE 2

Experiments were conducted to make clear the effect of the substituted amine salt with dialkyl sulfosuccinate on the separation of water from solvent.

Each 150 ml. glass-stoppered bottle was charged with 100 g. of a mixture consisting of 99.5% of 1,1,2-trichloro-1,2,2-trifluoroethane and 0.5% of a surface active agent as shown in Table 2. After adding 20 g. of water to each bottle, the bottles were shaken violently for one minute to form water-in-oil emulsion, and immediately, time required in separation of water from solvent was measured until the emulsion changed to transparent two layers.

The results are shown in Table 2.

Further, the water separation test was conducted in the same manner as the above by employing compositions containing only each of six kinds of the substituted amine salts with dialkyl sulfosuccinate listed in Table 2, but in all cases, the emulsion state did not completely disappeared even after 24 hours.

EXAMPLE 3

Experiments were conducted to make clear the duration of the water separating ability.

The same procedures as in Example 2 were repeated. Successively, after completely separating into the water layer and the solvent layer by allowing to stand, the upper water layer was removed by a hole pipette. Then,

TABLE 2

| Surface Active Agent | | Time required in separation (second) |
| --- | --- | --- |
| Amine or amine salt | Substituted amine salt with sulfosuccinate (plus other surface active agent) | |
| Polyoxyethylene(3)laurylamine | — | 280 |
| Polyoxyethylene(3)laurylamine | Di(2-hydroxypropyl)hexylamine salt with dilauryl sulfosuccinate | 80 |
| Polyoxyethylene(3)laurylamine | Triethanolamine salt with di-2-ethylhexyl sulfosuccinate | 70 |
| Polyoxyethylene(3)stearylethylamine | — | 310 |
| Polyoxyethylene(3)stearylethylamine | Octylamine salt with dihexyl sulfosuccinate | 100 |
| Polyoxyethylene(3)stearylethylamine | Polyoxyethylene(4)laurylamine salt with didecyl sulfosuccinate | 120 |
| Lauryldiethanolamine dibutylphosphate | — | 300 |
| Lauryldiethanolamine dibutylphosphate | Lauryldimethylamine salt with di-2-ethyl-hexyl sulfosuccinate | 110 |
| Lauryldiethanolamine dibutylphosphate | Lauryldimethylamine salt with di-2-ethyl-hexyl sulfosuccinate + Stearylamine octylate (2:1 by wt.) | 90 |
| Lauryldiethanolamine dibutylphosphate | Stearylamine octylate | 160 |
| A + Lauryldiethanolamine dioctylphosphate | — | 310 |
| A + Lauryldiethanolamine dioctylphosphate | Hexylamine salt with di-2-ethylhexyl sulfosuccinate | 110 |
| Polyoxyethylene(2)dilaurylamine nonylbenzenesulfonate | — | 320 |
| Polyoxyethylene(2)dilaurylamine nonylbenzenesulfonate | Stearylamine salt with di-n-octyl sulfosuccinate | 100 |
| Polyoxyethylene(2)dilaurylamine nonylbenzenesulfonate | Hexyldiethanolamine salt with di-n-octyl sulfosuccinate | 110 |

20 g. of water was added afresh to each bottles and the water separation test was repeated. The above procedures were repeated again and again.

The number of times of adding water afresh and the time required in separation are shown in Table 3.

TABLE 3

| Surface Active Agent | | Time required in separation (second) | | |
|---|---|---|---|---|
| Amine or amine salt | Substituted amine salt with sulfosuccinate (plus other surface active agent) | 3rd | 7th | 10th |
| Polyoxyethylene(3)laurylamine | — | 290 | 300 | 300 |
| Polyoxyethylene(3)laurylamine | Di(2-hydroxypropyl)hexylamine salt with dilauryl sulfosuccinate | 80 | 80 | 80 |
| Polyoxyethylene(3)stearylethylamine | — | 310 | 310 | 320 |
| Polyoxyethylene(3)stearylethylamine | Octylamine salt with dihexyl sulfosuccinate | 100 | 110 | 110 |
| Lauryldiethanolamine dibutylphosphate | — | 310 | 320 | 340 |
| Lauryldiethanolamine dibutylphosphate | Lauryldimethylamine salt with di-2-ethyl-hexyl sulfosuccinate | 110 | 110 | 120 |
| Lauryldiethanolamine dibutylphosphate | Lauryldimethylamine salt with di-2-ethyl-hexyl sulfosuccinate + Stearylamine octylate (2:1 by wt.) | 100 | 100 | 110 |
| Lauryldiethanolamine dibutylphosphate | Stearylamine octylate | 180 | 210 | 250 |
| A + Lauryldiethanolamine dioctylphosphate | — | 310 | 320 | 330 |
| A + Lauryldiethanolamine dioctylphosphate | Hexylamine salt with di-n-octyl sulfosuccinate | 110 | 110 | 120 |
| Polyoxyethylene(2)dilaurylamine nonylbenzenesulfonate | — | 330 | 330 | 340 |
| Polyoxyethylene(2)dilaurylamine nonylbenzenesulfonate | Hexyldiethanolamine salt with di-n-octyl sulfosuccinate | 110 | 110 | 120 |

What we claim is:

1. A composition suitable for use in removing water from solid surfaces which comprises:
   (a) a halogenated hydrocarbon solvent;
   (b) at least one member selected from the group consisting of amines having an oxyalkylene group of the following general formula:

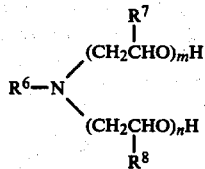

wherein $R^6$ is an alkyl group having 6 to 20 carbon atoms which may be straight chained or branch chained, $R^7$ and $R^8$ are hydrogen or methyl group, and m and n are 0 or an integer of 1 to 5 and m+n equals 1 to 10, or:

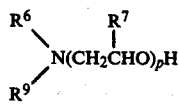

wherein $R^6$ and $R^7$ are as defined above, $R^9$ is an alkyl group having 1 to 15 carbon atoms, and p is an integer of 1 to 6, salts of said amine with an organic acid of the following general formula:

$R^1COOH, HOOCR^2COOH, R^1SO_3H, R^1OSO_3H,$
$R^1OPO_3H$ or $(R^1O)_2PO_2H$ wherein $R^1$ is an alkyl group having 1 to 20 carbon atoms which may be substituted with a hydroxyl group, or an alkylphenyl group having 7 to 26 carbon atoms and $R^2$ is an alkylene group having 1 to 10 carbon atoms, and quaternary ammonium salts of the following general formula:

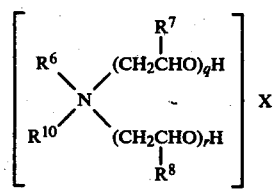

wherein $R^6$, $R^7$ and $R^8$ are as defined above, $R^{10}$ is an alkyl group having 1 to 20 carbon atoms, q and r are an integer of 1 to 5 and q+r equals 2 to 6, and X is an acid radical of said acids;

(c) at least one substituted amine salt with a dialkyl sulfosuccinate having the following general formula:

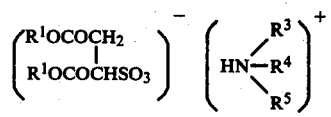

wherein $R^1$ is as defined above, and $R^3$, $R^4$ and $R^5$ are the same or different and each is hydrogen, an alkyl group having 1 to 20 carbon atoms which may be substituted with a hydroxyl group, or a polyoxyalkylene group, provided that all $R^3$, $R^4$ and $R^5$ are not hydrogen at the same time;

said (b) and (c) components being present in an amount of 0.5 to 10% by weight based on the weight of the solvent and said (c) component being present in an amount of 1 to 50% by weight based on the total weight of components (b) and (c).

2. The composition of claim 1, wherein the component (c) is employed in an amount of 5 to 30% by weight based on the total weight of the components (b) and (c).

* * * * *